(No Model.)
W. REYNOLDS.
PAD FOR THE FEET OF HORSES.
No. 272,156. Patented Feb. 13, 1883.
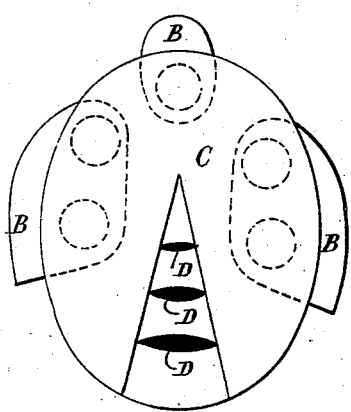
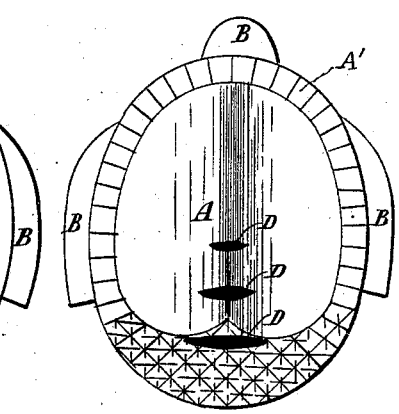
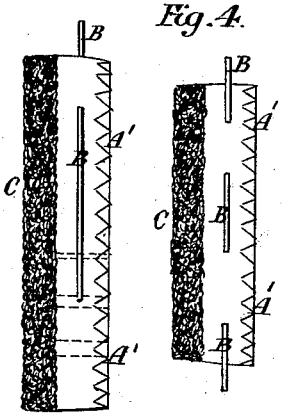
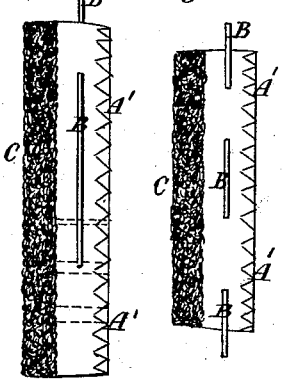
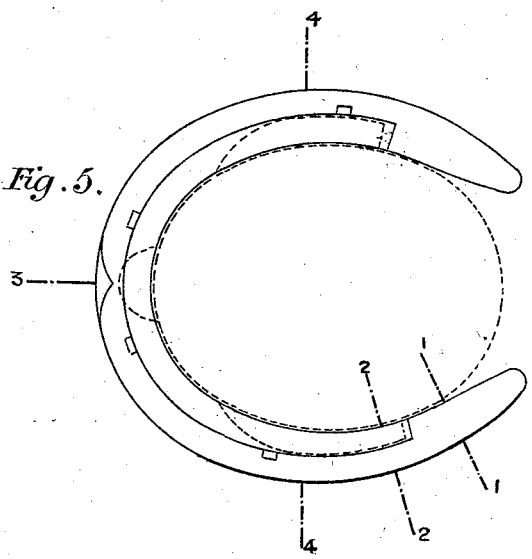
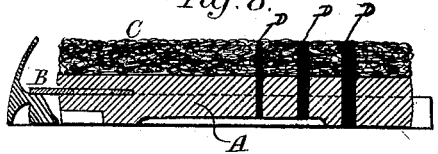

UNITED STATES PATENT OFFICE.

WILLIAM REYNOLDS, OF 514 OXFORD STREET, COUNTY OF MIDDLESEX, ENGLAND.

PAD FOR THE FEET OF HORSES.

SPECIFICATION forming part of Letters Patent No. 272,156, dated February 13, 1883.

Application filed November 6, 1882. (No model.) Patented in England October 10, 1881, No. 4,400, and in France April 8, 1882, No. 148,331.

*To all whom it may concern:*

Be it known that I, WILLIAM REYNOLDS, a subject of the Queen of Great Britain, residing at No. 514 Oxford street, in the county of Middlesex, England, have invented a certain new and useful Improvement in Pads for the Feet of Horses, (for which I have received Letters Patent in Great Britain, No. 4,400, dated 10th October, 1881, and in France, No. 148,331, dated April 8, 1882,) of which the following is a specification.

This invention has for its object an improvement in india-rubber pads for the feet of horses.

Prior to my invention there were in use pads of this class consisting mainly of solid vulcanized india-rubber, and such a pad was inserted into its place in the recess formed by the shoe and hoof of the horse, by means of suitable tongs by bending it so as to admit of metallic lugs or blades, with which the pad is provided, entering beneath the horseshoe. According to my invention, I form such pads with their inner surfaces of india-rubber sponge, which renders the pads much softer and more elastic to the tread of the horse, and better adapted to protect the frog of the horse's foot than the pads heretofore ordinarily employed. This "sponge" is a well-known material consisting of a rubber compound so treated as to cause it to "rise," like dough, in the baking or vulcanizing process. This material is not liable to undergo injurious change by the usage to which the pads are subjected.

In the accompanying drawings of my invention, Figure 1 is a plan, Fig. 2 is an under side view, Fig. 3 is a side view, and Fig. 4 is a front view, of a pad made in accordance with my invention. Fig. 5 is a plan of the horseshoe, the dotted lines indicating the pad and lugs. Figs. 6, 7, 8, and 9 are transverse sections on the lines 1 1, 2 2, 3 3, and 4 4 in Fig. 5.

My pad resembles pads at present in use in so far that it consists mainly of india-rubber compound vulcanized in a mold, and has metallic lugs. The lugs are inserted into the mold and the compound is molded upon them.

In the figures, the part marked A is molded in comparatively hard rubber, and B B B are the metal lugs. Onto the inner surface of the india-rubber compound is fixed a thickness, C, of india-rubber sponge, which, being very compressible and soft, is a great protection to the frog of the horse's foot.

D D represent passages through the pad for the purpose of ventilation.

A' A' is a grooving or checkering on the under side of the pad to give a better foothold.

Figs. 5, 6, 7, 8, and 9 indicate the manner in which the pad engages with the horseshoe, so that it cannot be forced out by the action of snow or otherwise. The lugs terminate at the rear in a square shoulder, slightly thickened, and the beveling of the horseshoe also is made to terminate in a corresponding shoulder. When the pad is inserted into its place, which is done by bending it with suitable tongs, as is now usual, the lugs of the pad engage with the shoulders of the shoe, and the pad cannot be forced backward.

Having thus described the nature of my said invention and the manner of performing the same, I would have it understood that I claim—

The pad having its inner surface of india-rubber sponge and its outer surface of solid vulcanized india-rubber, substantially as and for the purpose set forth.

WILLIAM REYNOLDS.

Witnesses:
W. J. NORWOOD,
WALTER JAMES SKERTEN,
*Both of 17 Gracechurch Street, London.*